United States Patent
Wu et al.

(10) Patent No.: US 12,557,163 B2
(45) Date of Patent: Feb. 17, 2026

(54) SELECTIVE FINE TIMING MEASUREMENT OF ACCESS POINTS

(71) Applicant: Hewlett Packard Enterprise Development LP, Spring, TX (US)

(72) Inventors: Junpeng Wu, Beijing (CN); Zhonglin Feng, Beijing (CN); Xiumeng Wang, Beijing (CN); Meng Zhao, Beijing (CN); Yiting Zheng, Beijing (CN); Sachin Ganu, Beijing (CN); Denis Houle, St. Laurent (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 656 days.

(21) Appl. No.: 18/045,698

(22) Filed: Oct. 11, 2022

(65) Prior Publication Data

US 2024/0121846 A1  Apr. 11, 2024

(51) Int. Cl.
*H04W 76/18* (2018.01)
*H04B 17/327* (2015.01)
*H04W 64/00* (2009.01)

(52) U.S. Cl.
CPC .......... *H04W 76/18* (2018.02); *H04B 17/327* (2015.01); *H04W 64/006* (2013.01)

(58) Field of Classification Search
CPC ... H04W 76/18; H04W 64/006; H04W 4/023; H04W 24/02; H04W 24/08; H04W 84/12; H04B 17/327
See application file for complete search history.

(56) References Cited

U.S. PATENT DOCUMENTS

| | | | |
|---|---|---|---|
| 9,999,010 B2 | 6/2018 | Segev | |
| 10,009,854 B2 | 6/2018 | Amizur et al. | |
| 10,104,635 B2 | 10/2018 | Malik et al. | |
| 10,939,407 B2 | 3/2021 | Steiner | |
| 10,945,202 B2 | 3/2021 | Xing | |
| 2017/0171833 A1 | 6/2017 | Vamaraju et al. | |
| 2019/0246349 A1* | 8/2019 | Xing | H04W 48/16 |
| 2019/0271774 A1 | 9/2019 | Zhang et al. | |
| 2019/0320407 A1* | 10/2019 | Goyal | H04L 41/5058 |
| 2020/0068520 A1 | 2/2020 | Marri Sridhar et al. | |

FOREIGN PATENT DOCUMENTS

WO   2018/200084 A1   11/2011

* cited by examiner

*Primary Examiner* — Charles C Jiang
*Assistant Examiner* — Rachel Elizabeth Marks
(74) *Attorney, Agent, or Firm* — Hewlett Packard Enterprise (57) ABSTRACT

Examples of performing selective Fine Timing Measurement (FTM) are described. For an FTM scan cycle, a first AP (i.e., an initiator) may determine scanning parameter values of a plurality of second APs (i.e., potential responders) based on previously performed FTM scans. The first AP may determine weights of the plurality of second APs based on the scanning parameter values and select a set of target APs based on the weights. The first AP may then scan the set of target APs for the FTM scan so that the rest of the plurality of second APs are relieved from participating in the FTM scan thereby reducing the performance impact on the rest of the plurality of second APs. After the FTM scan cycle is completed, the first AP may update the weights and select another set of target APs based on the updated weights to perform another FTM scan cycle.

20 Claims, 7 Drawing Sheets

| AP | RSSI | 21ST | | | 22ND | | | 23RD | | | 24TH | | | 25TH | | | 26TH | | |
|---|---|---|---|---|---|---|---|---|---|---|---|---|---|---|---|---|---|---|---|
| | | TC | FC | WEIGHT | TC | FC | WEIGHT | TC | FC | WEIGHT | TC | FC | WEIGHT | TC | FC | WEIGHT | TC | FC | WEIGHT |
| AP1 | -25 | 20 | 1 | 445 | (21) | 1 | 465 | (22) | 1 | 485 | (23) | 2 | 525 | 23 | 2 | 525 | (24) | 2 | 545 |
| AP2 | -31 | 20 | 3 | 491 | 20 | 3 | 491 | (21) | 3 | 511 | 21 | 3 | 511 | (22) | 3 | 531 | 22 | 3 | 531 |
| AP3 | -44 | 20 | 4 | 524 | 20 | 4 | 524 | 20 | 4 | 524 | 20 | 4 | 524 | (21) | 4 | 544 | 21 | 4 | 544 |
| AP4 | -50 | 20 | 2 | 490 | (21) | 2 | 510 | 21 | 2 | 510 | (22) | 2 | 530 | 22 | 2 | 530 | (23) | 2 | 550 |
| APs TO BE SCANNED | | AP1 and AP4 | | | AP1 and AP2 | | | AP1 and AP4 | | | AP2 and AP3 | | | AP1 and AP4 | | | AP2 and AP3 | | |

FTM SCAN CYCLES

| AP | RSSI | 21ST | | | 22ND | | | 23RD | | | 24TH | | | 25TH | | | 26TH | | |
|---|---|---|---|---|---|---|---|---|---|---|---|---|---|---|---|---|---|---|---|
| | | TC | FC | WEIGHT | TC | FC | WEIGHT | TC | FC | WEIGHT | TC | FC | WEIGHT | TC | FC | WEIGHT | TC | FC | WEIGHT |
| AP1 | -25 | 20 | 1 | 445 | (21) | 1 | 465 | (22) | 1 | 485 | (23) | 2 | 525 | 23 | 2 | 525 | 23 | 2 | 525 |
| AP2 | -31 | 20 | 3 | 491 | 20 | 3 | 491 | 20 | 3 | 491 | 20 | 3 | 491 | 20 | 3 | 491 | (21) | 3 | 511 |
| AP3 | -44 | 20 | 4 | 524 | 20 | 4 | 524 | 20 | 4 | 524 | 20 | 4 | 524 | 20 | 4 | 524 | 20 | 4 | 524 |
| AP4 | -50 | 20 | 2 | 490 | 20 | 2 | 490 | 20 | 2 | 490 | 20 | 2 | 490 | (21) | 2 | 510 | 21 | 2 | 510 |
| AP TO BE SCANNED | | AP1 | | | AP1 | | | AP1 | | | AP4 | | | AP2 | | | AP1 | | |

FTM SCAN CYCLES

SELECTIVE FINE TIMING MEASUREMENT OF ACCESS POINTS

BACKGROUND

Typically, a Wireless Local Area Network (WLAN) includes access points hosted at several locations in a facility to provide wireless connectivity to client devices. Client devices such as laptops, personal computers, smartphones, etc. may connect to an AP in the WLAN to exchange data. To connect to a suitable AP in the WLAN, the client devices may initiate ranging requests with the APs. A ranging technique such as a Fine Timing Measurement (FTM) protocol as supported by the Institute of Electrical and Electronics Engineers (IEEE) 802.11mc Specification has been increasingly used due to wide compatibility between the APs and the client devices.

BRIEF DESCRIPTION OF THE DRAWINGS

One or more examples in the present disclosure are described in detail with reference to the following Figures. The Figures are provided for purposes of illustration only and merely depict examples.

The Figures are not exhaustive and do not limit the present disclosure to the precise form disclosed.

DETAILED DESCRIPTION

There has been increasing adoption of FTM protocol among different client devices and APs. The FTM protocol may be used to establish a distance between wireless devices supporting the FTM protocol. A wireless device initiating a ranging request is hereinafter referred to as an initiator and a wireless device receiving the ranging request is hereinafter referred to as a responder. The FTM protocol described in IEEE 802.11mc Specification includes exchanging messages between the initiator and one or more responders to determine a distance between the initiator and the one or more responders. Based on the messages exchanged between the initiator and one or more responders, the initiator may determine its position relative to the responders.

In common implementations, a client device is an initiator which initiates range measurements, and APs in a network serve as responders. With many of the communication devices supporting the FTM protocol, each AP in the network may receive multiple ranging requests. In certain circumstances, an AP as a responder may get overloaded with several ranging requests that consume significant airtime. Also, some client devices may raise multiple ranging requests within short time intervals, which may also overload the AP. With this kind of management traffic, the APs are engaged with responding to these ranging requests thereby congesting a channel on which these devices communicate.

Further, wireless networking standards, for example, the IEEE 802.11 mc, allow both associated and non-associated client devices to raise ranging requests. This further causes an increase in channel traffic with multiple ranging requests from both the associated and the non-associated devices. The APs would be serving the associated clients for FTM and non-FTM related traffic. In addition, the APs would be responding to the multiple FTM requests from the non-associated clients. This will add to the contention delays on the channel. For instance, if the AP is serving high-priority traffic, such as voice/video or VoIP (Voice Over Internet Protocol) traffic, and receives multiple ranging requests in parallel, the AP may not be able to respond to the ranging requests while serving the data traffic. This may lead to denial of service to certain client devices. Furthermore, a client device, which is associated with a particular AP on one channel, may still send ranging requests to another AP on a different channel thereby keeping APs engaged.

Furthermore, in some instances, the APs in the network may also be configured to act as initiators. For instance, with advancements in WLAN technologies, efforts are made for the APs to locate themselves on a global or virtual map to support certain location-based services. For example, an AP may also be configured to initiate ranging requests with the other APs to locate itself with reference to its neighbor APs, and use such information to locate itself on a global or virtual map. Accordingly, such additional ranging requests from such initiators (e.g., AP as initiators) may also keep the responder APs busy.

Additionally, the initiators (e.g., APs or associated or non-associated client devices) typically perform ranging measurement cycles several times in a given duration. In each cycle, responders are scanned by sending ranging requests. Due to such an increased number of ranging requests from several initiators, the responders may not be able to effectively and timely respond to the ranging request. This may result in inefficient ranging measurements. Moreover, as described earlier it may also negatively impact the performance of the responders.

In accordance with examples consistent with the present disclosure, an enhanced example method of performing FTM scanning by a wireless station is presented. The wireless station may be any wireless capable device supporting one or more IEEE Specifications for ranging measurements, for example, IEEE 802.11 mc. In the description hereinafter, examples are presented with reference to an initiator being an AP, however, other types of wireless stations, for example, wireless client devices may also be configured to implement methods described herein. In some examples, the proposed example method may enable the FTM scanning by an initiator in such a way that the responders (e.g., FTM capable APs in WLAN) are not heavily burdened with the ranging requests. In particular, for an FTM scan cycle, instead of performing FTM scans for all APs, a set of target APs is scanned, and the rest of the APs are not scanned. Accordingly, the non-scanned APs may be relieved from the burden of participating in the FTM scans resulting in a reduced impact on their performances. Further, the proposed example method enables a selection of a set of target APs such that the majority or all of the APs in a neighborhood of an initiator are scanned over some time which will be helpful in more accurately locating the initiator relative to other APs.

To enable such an enhanced FTM scanning, in some examples, for a first FTM scan cycle, a first AP (i.e., an initiator) may determine scanning parameter values corresponding to a plurality of second APs (i.e., responders) based on FTM scans that the first AP previously performed for the plurality of second APs. The second APs may be the neighbor APs of the first AP that are FTM capable (i.e., enabled to support FTM as responders). Examples of the scanning parameter values comprise one or more of a count of FTM scans performed, a count of failed FTM scans, or a wireless signal strength. In some examples, for a first/initial FTM scan to be performed by the first AP, the first AP does not have the scanning parameter values corresponding to a plurality of second APs. In some examples, to begin an FTM scanning process, upon initializing, the first AP may perform a predetermined number of FTM scans for each of the plurality of APs and record the scanning parameter values. The first AP may keep a record of these scanning parameter values for each of the plurality of second APs.

Further, the first AP may determine weights corresponding to the plurality of second APs based on the scanning parameter values. Then, the first AP may select a first set of target APs from the plurality of second APs. In some examples, the count of the target APs in the first set of target APs may be smaller than the total count of the plurality of second APs. In certain examples, the first set of target APs may include only one target AP. Once selected, the first AP may scan (e.g., perform an FTM scan) the first set of target APs for the first FTM scan cycle. After the first set of target APs is scanned for the first FTM scan cycle, the first AP may update the scanning parameter values which it will use for the next FTM scan cycle to determine the weights of the plurality of second APs.

To perform a subsequent FTM scan cycle, for example, a second FTM scan cycle, the first AP may update the weights of the plurality of second APs based on the updated scanning parameter values after the previous FTM scan cycle (e.g., the first FTM scan cycle) is completed. The first AP may then select a second set of target APs from the plurality of second APs based on the updated weights. In some examples, the count of the target APs in the second set of target APs may be smaller than the total count of the plurality of second APs. In certain examples, the first set of target APs may include only one target AP. Also, in some instances, the second set of target APs may have one or more target APs different from the first set of target APs. Once selected, the first AP may scan the second set of target APs for the second FTM scan cycle and update the scanning parameter values. The first AP may use the updated scanning parameter values in determining the weights of the plurality of second APs for the next FTM scan cycle. Scanning a set of APs (e.g., the first set of APs or the second set of APs) for a given FTM scan cycle (e.g., the first FTM scan cycle or the second FTM scan cycle) may mean performing an FTM scan for the set of target APs for the given FTM scan cycle.

By performing an FTM scan for the selected subsets (e.g., the first set of target APs and the second set of target APs) of the plurality of the second APs in each scan cycle, the rest of the second APs may be relieved from the burden of participating in the FTM scan cycle as responders. Moreover, the weights of the second APs are calculated such that the set of the target APs selected over a certain number of scan cycles may have at least certain different target APs. Such a selection of the target APs may allow the majority or all of the plurality of second APs to be scanned over time. As will be appreciated, the proposed enhanced FTM scanning provides an opportunity for the majority or all of the plurality of second APs to be scanned while reducing the number of times each second AP is scanned over time. Due to the reduction in the scanning frequency for the second APs, the second APs can effectively utilize their respective resources to serve respective client devices. Also, by intelligently utilizing the scanning parameter values such as the count of FTM scans performed and the count of the failed FTM scans, scanning of certain second APs that frequently fail the FTM scan may be minimized resulting in faster scans and an improved scan success rate/scanning efficiency.

The following detailed description refers to the accompanying drawings. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Figure 1:
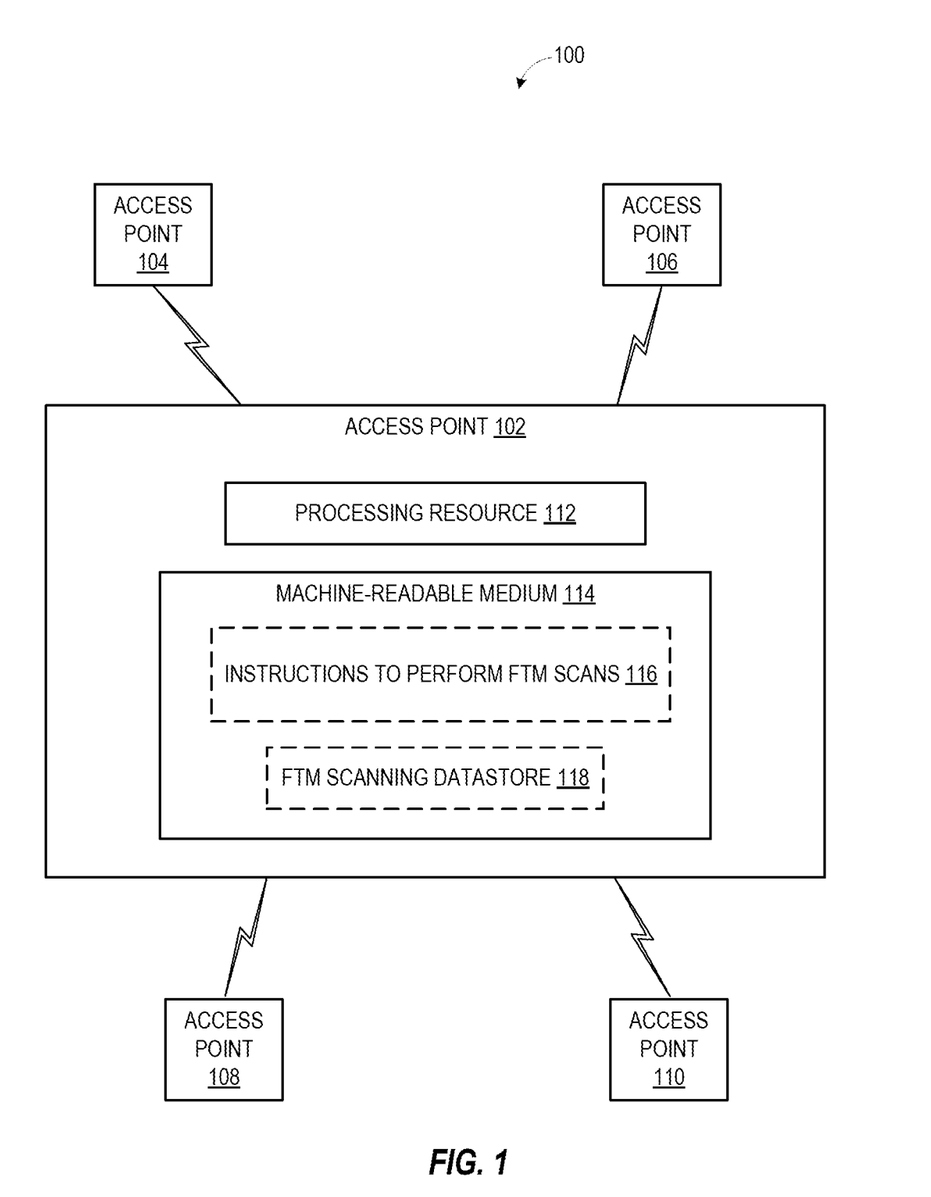
FIG. 1 depicts a system in which various of the examples presented herein may be implemented.

Before describing examples of the disclosed systems and methods in detail, it is useful to describe an example network installation with which these systems and methods might be implemented in various applications. FIG. 1 illustrates a system 100 in which various of the examples presented herein may be implemented. The system 100 may be implemented in any setup for example, in a home setup or an organization, such as a business, educational institution, governmental entity, healthcare facility, or other organization. The system 100 depicts a network of devices (hereinafter referred to as network devices) for example, an access point (AP) 102 (hereinafter referred to as a first AP 102) and a plurality of neighbor access points (APs) such as the APs 104, 106, 108, and 110, hereinafter collectively referred to as neighbor APs 104-106. The system 100 may include a greater or fewer number of APs than depicted in FIG. 1.

An AP is said to be a neighbor for the first AP 102 if the AP satisfies predetermined neighborhood criteria, for example, the AP that is installed in a predetermined radius from the first AP. In one example, the predetermined radius may be defined in terms of a physical distance (e.g., certain meters or feet from the first AP 102). In another example, the predetermined radius may be defined in terms of wireless signal strength, for example, a received signal strength indicator (RSSI) value. An RSSI value is a measurement of the power present in a received radio signal at a receiving device, such as, the first AP 102 in the present implementation of FIG. 1. For instance, APs for which the first AP has an RSSI value higher than a predetermined threshold value may be considered as a neighbor AP for the first AP. For the purpose of illustration hereinafter, the APs 104-110 are described as being neighbor APs. It is to be noted that the examples presented herein are not limited with respect to the neighborhood criteria used to identify neighbor APs.

Although not shown in FIG. 1, in some examples, the system 100 may include additional network devices such as additional APs, wireless local area network (WLAN) controllers, network switches, gateway devices, routers, client devices, and the like. The client devices may be electronic devices capable of wirelessly communicating with an AP 102 or other electronic devices. Examples of the client devices that may be deployed in the system 100 may include desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smartphones, smart terminals, dumb terminals, virtual terminals, video game consoles, virtual assistants, Internet of Things (IoT) devices, and the like.

Communications between the first AP 102 and the neighbor APS 104-110 (and/or client devices, if any) may be facilitated via wireless communication links according to wireless communication protocols such as 802.11 standards, Wi-Fi Alliance Specifications, or any other wireless communication standards. In some examples, the communication between the first AP 102 and the neighbor APS 104-110 (and/or client devices, if any) may be carried out in compliance with one or more of the IEEE 802.11 Specifications. In particular, the AP 102 and one or more of the neighbor APS 104-110 (and/or one or more client devices, if any) may support IEEE 802.11 mc Specification that enables the provision of Fine Timing Measurement (FTM) by wireless stations (e.g., wireless stations such as APs and client devices).

Each of the APs 102-110 may be a combination of hardware, software, and/or firmware that is configured to provide wireless network connectivity to respective client devices (not shown). In some examples, the AP 102 may comprise, be implemented as, or known as a radio router, radio transceiver, a switch, a Wi-Fi hotspot device, Basic Service Set (BSS) device, Extended Service Set (ESS) device, radio base station (RBS), or some other terminology and may act as a point of network access for respective client devices.

In some examples, the AP 102 may include a processing resource 112 and/or a machine-readable storage medium 114 for the AP to execute several operations as will be described in the greater details below. The machine-readable storage medium 114 may be non-transitory and is alternatively referred to as a non-transitory machine-readable storage medium that does not encompass transitory propagating signals. The machine-readable storage medium 114 may be any electronic, magnetic, optical, or other storage device that may store data and/or executable instructions. Examples of the machine-readable storage medium 114 that may be used in the AP 102 may include Random Access Memory (RAM), non-volatile RAM (NVRAM), an Electrically Erasable Programmable Read-Only Memory (EEPROM), a storage drive (e.g., a solid-state drive (SSD) or a hard disk drive (HDD)), a flash memory, and the like. The machine-readable storage medium 114 may be encoded with executable instructions 116 (depicted using a dashed box in FIG. 1) for performing FTM scanning. Although not shown, in some examples, the machine-readable storage medium 114 may be encoded with certain additional executable instructions to perform any other operations performed by the AP 102, without limiting the scope of the present disclosure. Further, in some examples, the machine-readable storage medium 114 may be encoded with FTM scanning datastore 118. The FTM scanning datastore 118 may store weights of one or more of the neighbor APs 104-110 which the processing resource 112 may use to identify a set of target APs to scan in a given FTM scan cycle.

The processing resource 112 may be a physical device, for example, a central processing unit (CPU), a microprocessor, a graphics processing unit (GPU), a field-programmable gate array (FPGA), application-specific integrated circuit (ASIC), other hardware devices capable of retrieving and executing instructions stored in the machine-readable storage medium 114, or combinations thereof. The processing resource 112 may fetch, decode, and execute the instructions 116 stored in the machine-readable storage medium 114 to perform FTM scanning (described later). As an alternative or in addition to executing the instructions 116, the processing resource 112 may include at least one integrated circuit (IC), control logic, electronic circuits, or combinations thereof that include a number of electronic components for performing the functionalities intended to be performed by the first AP 102.

The term "FTM scan cycle" as used herein may refer to an event of performing FTM. Typically, in known techniques, an initiator may perform one or more FTM scans for each of the responders in a single FTM scan cycle. The term "initiator" may as used herein may refer to a station that initiates an FTM scan. Further, the term "responder" as used herein may refer to a station that participates in the FTM scan by responding to an FTM scan request from the initiator. Further, in the description hereinafter, for the purpose of illustration, a responder (e.g., a set of target APs) is described to be scanned a single time in a given FTM scan cycle. In some examples, performing more than one FTM scan for the responder is also envisioned within the purview of the present disclosure. Performing an FTM scan or scanning the responder for an FTM scan cycle may involve exchanging messages between the initiator and the responder to determine the distance between the initiator and the responder. Based on the messages exchanged between the initiator and the responder, the initiator may determine its position relative to the responders.

In accordance with the examples presented herein, a wireless station, such as, the first AP 102 may be configured to execute an FTM scan cycle in such a way that potential responders (e.g., FTM capable neighbor APs) for the FTM are not heavily burdened with FTM. The first AP 102 may identify APs are capable of responding to FTM requests. Such, APs that are identified as capable of responding to FTM requests are hereinafter referred to as second APs or candidate responder APs. For example, the APs 104, 106, and 108 may be capable of responding to the FTM scan requests and may therefore be identified as second APs, hereinafter collectively referred to as second APs 104-108. Example details of identifying the second APs are described in conjunction with a method of FIGS. 3A-3B.

For an FTM scan cycle, instead of scanning (e.g., performing FTM scan) all of the second APs 104-106, the first AP 102 may select a set of target APs from the second APs based on respective weights. The term "weight" of a second AP as used herein is a scanning metric calculated based on scanning parameter values corresponding to the second AP. The weight of the second AP may be indicative of a scanning priority of the AP. In accordance with some examples, the first AP 102 determines the weights corresponding to the second APs based on scanning parameter values corresponding to the second APs. The first AP 102 determines the scanning parameter values based on previously performed FTM scans for the second APs. In particular, these scanning parameter values may be statistical values corresponding to scanning parameters such as FTM scans performed and failures of the FTM scans. The scanning parameter values may also be based on a qualitative scanning parameter such as wireless signal strength at the first AP 102 from the second AP. The wireless signal strength may be measured as an RSSI value at the first AP. Example scanning parameter values may be a count of FTM scans performed, a count of failed FTM scans, and/or the wireless signal strength (e.g., RSSI value). Also, by intelligently utilizing the scanning parameter values such as the count of FTM scans performed and the count of the failed FTM scans, scanning of certain second APs that frequently fail the FTM scan may be minimized resulting in faster scans and an improved scan success rate/scanning efficiency. An example method of determining the weights of the second APs is described in conjunction with the method of FIGS. 3A-3B.

For a given FTM scan cycle, the first AP may select a set of target APs based on the weights of the second APs 104-108. In one example, the first AP may select only a single AP that has the lowest weight as the target AP. Once the set of target APs is selected from the second APs, the first AP 102 may scan (e.g., perform an FTM scan) the selected set of target APs in the given FTM scan cycle. As will be appreciated, as only a set of APs (i.e., selected APs) is scanned for FTM and the rest of the second APs are not scanned for the FTM in the given FTM cycle, the non-scanned APs may be relieved from the burden of participating in the FTM scans resulting in a reduced impact on their performances. Once the given FTM scan cycle is completed, the first AP may update the scanning parameter values and the weights of the second AP, which it will use to select another set of target APs for the next FTM scanning cycle. Accordingly, in the next FTM scanning cycle, the first AP 102 may scan another set of the target APs. Likewise, the first AP may perform several FTM scan cycles during its operation and, for each FTM scan cycle, the first AP may use updated weights of the second AP to select a set of target AP. In some examples, as will be described later, the proposed example method enables a selection of the set of target APs such that the majority or all of the APs in a neighborhood of an initiator are scanned over a certain duration which will be helpful in more accurately locating the initiator (e.g., the first AP 102) relative to other APs (e.g., one or more of the second APs).

Figure 2:
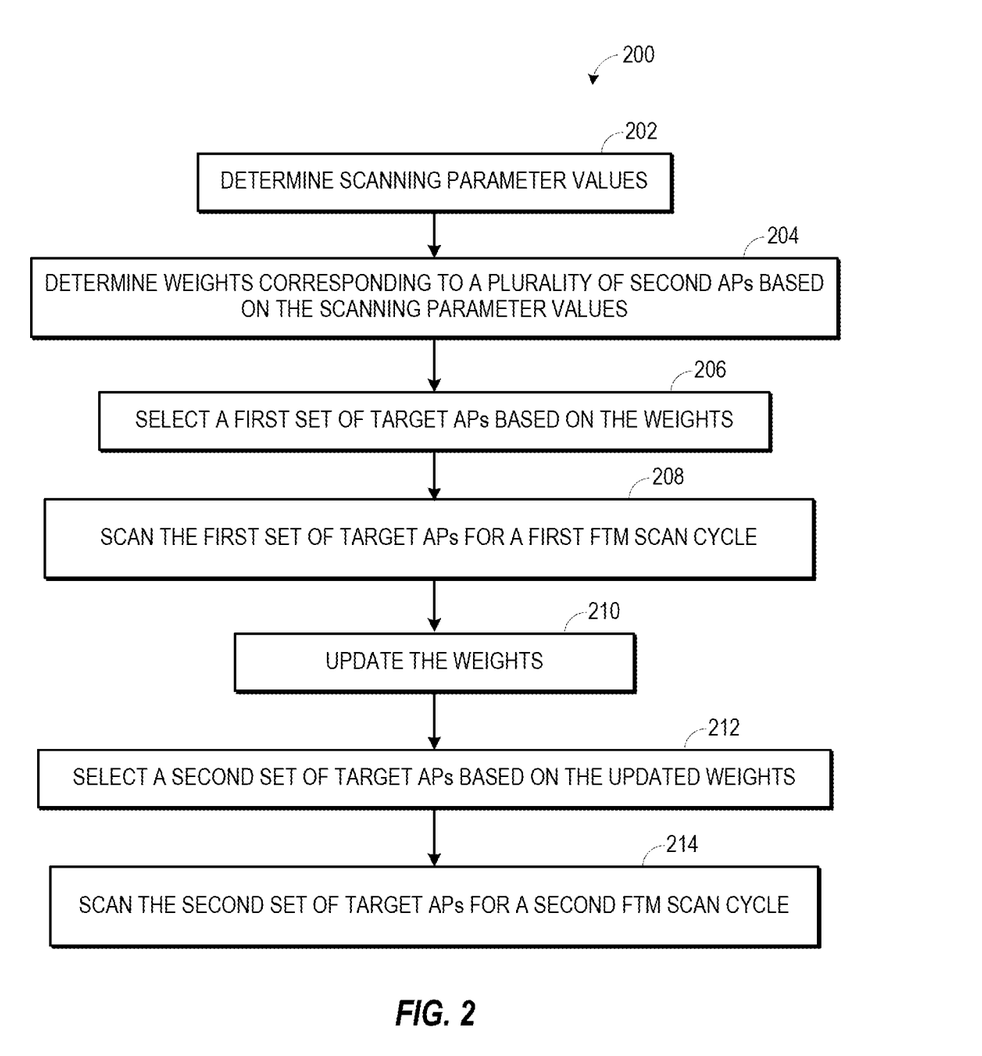
FIG. 2 depicts a flowchart of an example method for performing Fine Timing Measurement (FTM) for a plurality of access points (APs).

Referring now to FIG. 2, a flowchart of an example method 200 for performing an FTM is presented. In some examples, the steps shown in FIG. 2 may be performed by any suitable device, such as an AP (e.g., the first AP 102 of FIG. 1). In some examples, the suitable device may include a hardware processing resource, such as one or more central processing units (CPUs), semiconductor-based microprocessors, and/or other hardware devices suitable for retrieval and execution of instructions (e.g., the instructions 116 depicted in FIG. 1) stored in a machine-readable storage medium. The processing resource may fetch, decode, and execute instructions, to perform the FTM as described. As an alternative or in addition to retrieving and executing instructions, the processing resource may include one or more electronic circuits that include electronic components for performing the functionality of one or more instructions, such as an FPGA, ASIC, or other electronic circuits. The processing resource and the machine-readable storage medium may be example representatives of the processing resource 112 and the machine-readable storage medium 114 of the AP 102 FIG. 1. The method 200 includes several steps in an order. However, the order of steps shown in FIG. 2 should not be construed as the only order for the steps. The steps may be performed at any time, in any order. Additionally, the steps may be repeated or omitted as needed.

At step 202, a first AP may determine scanning parameter values, to perform a first FTM scan cycle, corresponding to a plurality of second APs based on previously performed FTM scans for the plurality of second APs. The second APs may be a set of neighbor APs that is capable of supporting the FTM as responders. The scanning parameter values may be statistical values such as the count of FTM scans performed and a count of failed FTM scans; and/or qualitative scanning parameter values such as an RSSI at the first AP 102 from the second AP. In some examples, the first AP maintains a track of the previous FTM scan performed and updates the scanning parameter values after each FTM scan completes. Accordingly, at step 202, the processing resource of the first AP may access a data repository, for example, an FTM scanning datastore, to retrieve the latest scanning parameter values.

Further, at step 204, the first AP may determine weights corresponding to the plurality of second APs based on the scanning parameter values. In particular, the first AP may apply one or more mathematical functions to the scanning parameter values to determine the weights for each of the second APs. In one example, to calculate a weight corresponding to a given second AP, the first AP may add the wireless signal strength (i.e., RSSI value) to a weighted sum of the count of FTM scans performed and the count of the failed FTM scans. Likewise, upon execution of the step 204, the first AP may have calculated the weights of all of the second APs. In some examples, the first AP may store the weights of the second APs in the FTM scanning datastore.

Furthermore, at step 206, the first AP may select a first set of target APs from the plurality of second APs based on the weights. The first set of target AP may include one or more of the second APs selected based on a predetermined selection criterion. In one example, the predetermined selection criterion may be to select one or more of the second APs that have weights lower than a predefined threshold value as the first set of target APs. In another example, the predetermined selection criterion may be to select a predefined percentage of the second APs in ascending order of their weights as the first set of target APs. In another example, the predetermined selection criterion may be to select APs whose weights are smaller than an average of the weights of all of the second APs as the first set of target APs. In another example, the predetermined selection criterion may be to select APs whose weights are smaller than the average of the weights of all of the second APs by a predetermined number of standard deviations (e.g., 1, 2, or 3 standard deviations) as the first set of target APs. In another example, the predetermined selection criterion may be to select a predetermined number of bottom-weighted APs (see FIG. 4, for example) as the first set of target APs. In yet another example, the predetermined selection criterion may be to select the AP having the lowest weight as the set of target APs.

Once the set of first target APs is selected, the first AP, at step 208, may scan the first set of target APs for the first FTM scan cycle. In some examples, scanning the first set of target APs may include establishing, by the first AP, FTM sessions with the first set of target APs. Once the FTM sessions are established, one or more ranging messages may be exchanged between the first AP and each of the first set of target APs. Based on the exchange of the ranging messages, the first AP may determine a time of arrival (TOA), a round trip time (RTT), or a time difference of arrival (TDOA) of the wireless communication signals. The first AP may use the RTT, TOA, and TDOA information to determine its position relative to the set of target APs in a wireless communication network. After scanning the first set of target APs have been scanned for the first FTM scan cycle, the first AP may also mark the end of the first FTM scan cycle.

In some examples, once the first FTM scan cycle is completed, the first AP, at step 210, may update the weights of the plurality of second APs to generate updated weights to conduct a second FTM scan cycle. The first AP may perform a second FTM scan cycle after a predetermined duration (e.g., at a periodic interval) from the completion of the first FTM scan cycle. To initiate the second FTM scan cycle, the first AP may update the scanning parameter values such as the count of FTM scans performed, the count of failed FTM scans, and/or the wireless signal strength for each of the second APs after the first FTM scan cycle is completed. Updating the weights of the plurality of second APs at step 210 may include recalculating the weights based on these updated scanning parameter values. The first AP may recalculate the weights of the plurality of second APs in a similar manner as described in conjunction with step 204.

Further, at step 212, the first AP may select a second set of target APs from the plurality of second APs based on the updated weights. The second set of target AP may include one or more of the second APs selected based on a predetermined selection criterion. In some examples, based on the updated weights of the second APs, the second set of target APs may include one or more target APs different from the first set of target APs. At step 214, the first AP may scan the second set of target APs for the second FTM scan cycle, for example, in a similar fashion as described with reference to the step 208.

Moreover, after the second FTM scan cycle is completed, the first AP may again update the scanning parameter values and the weights of the second APs to select a set of target APs to execute the next FTM scanning cycle. Likewise, the first AP may perform a predetermined number of FTM scan cycles and after the predetermined number of FTM scan cycles to AP may stop performing the FTM scanning. In some examples, the first AP may perform a number of FTM scan cycles until a threshold number/percentage of second APs are scanned (e.g., until at least four of the five second APs have been scanned). In some examples, the first AP may perform a number of FTM scan cycles for a specified interval (e.g., for an hour every day, or an hour in a week, etc.).

Figure 3A:
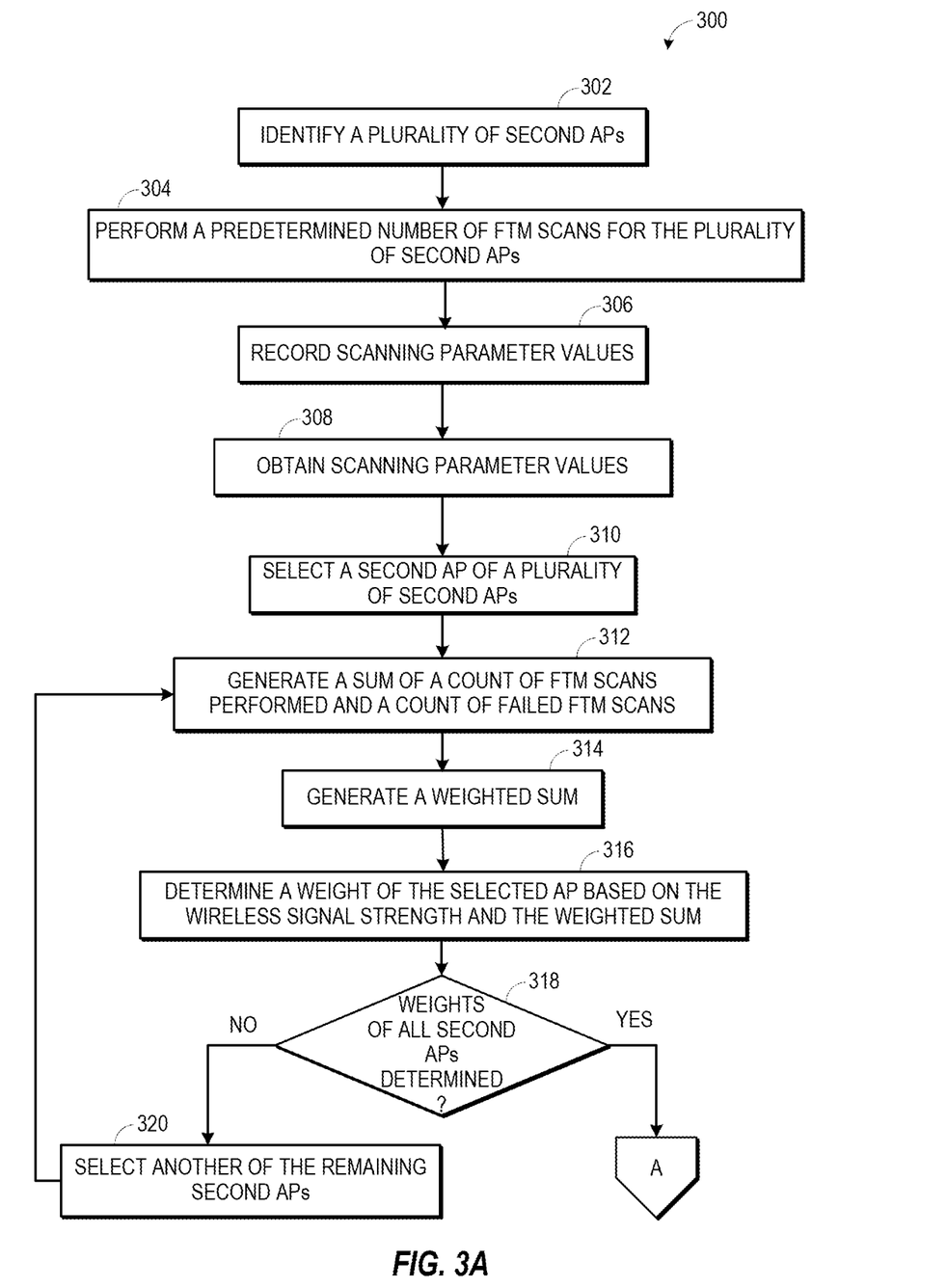
FIGS. 3A and 3B depict a flowchart of another example method for performing FTM for a plurality of APs.
Figure 3B:
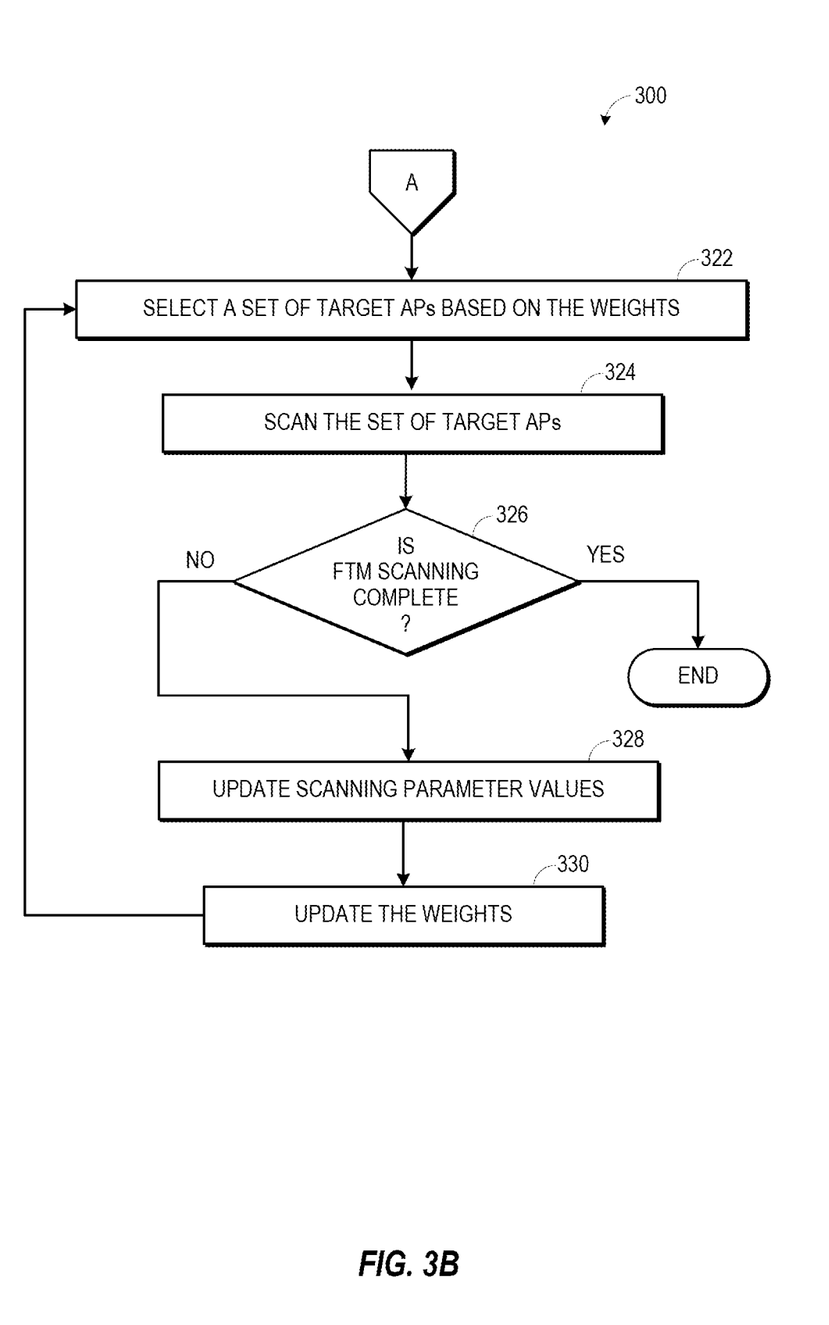

Turning now to FIGS. 3A and 3B, FIGS. 3A and 3B collectively represent a flowchart of an example method 300 for performing an FTM. The method 300 of FIGS. 3A-3B may be an example representative of the method 200 of FIG. 2. The method 300 include certain steps similar to those described in conjunction with the method 200, certain description of which is not repeated herein for the sake of brevity. In some examples, the steps shown in FIGS. 3A-3B may be performed by any suitable device, such as an AP (e.g., the first AP 102 of FIG. 1) by way of executing instructions (e.g., the instructions 116 depicted in FIG. 1) via a processing resource. The method 300 includes several steps in an order. However, the order of steps shown in FIGS. 3A-3B should not be construed as the only order for the steps. The steps may be performed at any time, in any order. Additionally, the steps may be repeated or omitted as needed.

When the first AP initiates an FTM scan for the first time (for example, upon reboot or first use), the first AP may not have information corresponding to the scanning parameter values. Accordingly, the first AP may be configured to perform a training phase to learn the values of the scanning parameter values. In the training parameter values, the first AP may identify APs that are FTM capable and perform certain FTM scans and learn the scanning parameter values. Steps 302, 304, and 306 represent an example sequence of operations to conduct the training phase.

At step 302, the first AP may identify a plurality of second APs from neighbor APs based on an FTM support of the neighbor APs. The neighbor APs may often broadcast beacon frames to let other wireless devices (e.g., other APs and client devices) know about their presence. The beacon frames broadcasted by a given neighbor AP may include elements that include information about the FTM capability of the given neighbor AP. Generally, the FTM capabilities are included in an extended capabilities element of the beacon frames which may include several octets specifying the support for various features supported by the given AP. For example, a bit 70 in the extended capabilities element may be set to 1 if the given AP is enabled to act as an FTM responder, and a bit 71 may be set to 1 if the given AP is enabled to act as an FTM initiator. Accordingly, in some examples, at step 302, the first AP may check the beacon frames to verify (e.g., by checking the bit 70 in the extended capabilities element) if the respective AP is enabled to act as the FTM responder. The first AP may identify all those APs that are enabled to act as the FTM responder as the second APs.

Further, at step 304, the first AP may perform a predetermined number of FTM scans for the plurality of second APs identified at step 302. To perform the FTM scans at step 304, the first AP may establish FTM sessions with each of the plurality of second APs. Once the FTM sessions are established, the first AP may exchange one or more ranging messages with each of the plurality of second APs and perform several measurements, for example, TOA, RTT, and TDOA for each of the FTM scans. By way of example, the first AP may perform 20 FTM scans at step 304.

Furthermore, at step 306, the first AP may record the scanning parameter values such as the count of FTM scans performed (e.g., 20), the count of failed FTM scans, or the wireless signal strength (e.g., RSSI values) for each of the second APs. The first AP may store these scanning parameter values in the FTM scanning datastore as training results and end the training phase. The first AP may use these training results to perform selective FTM scanning after a runtime phase (i.e., operation of the first AP after the training phase ends). By way of example, the runtime phase may include steps 308 through 330.

At step 308, the AP may obtain scanning parameter values, to perform a first FTM scan cycle (e.g., an FTM scan cycle after the training phase is over), corresponding to the plurality of second APs. In particular, in some examples, the first AP may retrieve the scanning parameter values such as the count of FTM scans performed, the count of failed FTM scans, or the wireless signal strength for each of the second APs from the FTM scanning datastore.

After the scanning parameter values are obtained, the first AP may determine weights corresponding to the plurality of second APs based on the scanning parameter values. Steps 310 to 320 describe example operations performed to determine the weights corresponding to the plurality of second APs. In particular, at step 310, the first AP may select one of the second APs. Further, at step 312, the first AP may generate a sum of the count of FTM scans performed and the count of failed FTM scans. Equation (1) presented below represents an example sum (S).

$$S = TC + FC \qquad \text{Equation(1)}$$

where, TC represents the count of FTM scans performed and FC represents the count of failed FTM scans.

At step 314, the first AP may generate a weighted sum by multiplying the first sum of the count of FTM scans performed and the count of failed FTM scans. Equation (2) presented below represents an example weighted sum (WS).

$$WS=MF\times(TC+FC) \qquad \text{Equation(2)}$$

where, MF represents a multiplication factor.

In some examples, the multiplication factor may be a predefined value. The multiplication factor may be customizable by an administrator of the first AP. In some examples, the multiplication factor may be determined based on a range of wireless signal strength, for example, a predetermined RSSI range which may be preconfigured, defined by the administrator, and customizable by the administrator. In some examples, the multiplication factor may be defined as a fraction of the predetermined RSSI range. For example, if the predetermined RSSI range is 0 to −100 decibel (dB), the multiplication factor may be chosen to be ⅕ of the predetermined RSSI range, which is 20.

Further, at step 316, the first AP may determine the weight of the selected AP based on the wireless signal strength corresponding to the selected AP and the weighted sum of the and the count of FTM scans performed and the count of failed FTM scans. Equation (3) presented below represents an example calculation of the weight (WEIGHT) of the selected AP.

$$WEIGHT=WS+|RSSI| \qquad \text{Equation(3)}$$

where, |RSSI| represents an absolute value of the RSSI corresponding to the selected second AP at the first AP.

At step 318, the first AP may perform a check to determine if the weights corresponding to all of the second APs have been determined. At step 318, if it is determined that weights corresponding to all of the second APs have not been calculated, at step 320, the first AP may select another second AP from the remaining second APs for weight determination. After selecting another AP, the first AP may again move the execution to step 312, and again perform the steps 312-318 for the newly selected second AP at step 320. However, at step 318, if it is determined that weights corresponding to all of the second APs have not been determined, the first AP may proceed to perform an FTM scan cycle, for example, by executing steps 322 and 324 shown in FIG. 3B. In particular, at step 322, the first AP may select a set of target APs from the plurality of second APs based on the weights according to a predetermined selection criterion, in a similar fashion as described in conjunction with the method 200. Once the set of target APs is selected, the first AP, at step 324, may scan the set of target APs for the ongoing FTM scan cycle.

After the set of target APs are scanned for the ongoing FTM scan cycle, the first AP may mark the end of the first FTM scan cycle and perform a check, at step 326 to determine if FTM scanning is completed (i.e., to determine if there is a need to perform another FTM scan cycle). To determine whether the FTM scanning is completed, the first AP may determine if a predetermined completion criterion has been met. In one example, the predetermined completion criterion may be a completion of a predetermined number of FTM scan cycles. In another example, the predetermined completion criterion may be a threshold number/percentage of the second APs have been scanned (e.g., until at least four of the five second APs have been scanned). In another example, the predetermined completion criterion may be the FTM scanning process has completed a predetermined duration (e.g., for an hour every day, or an hour in a week, etc.). In yet another example, the predetermined completion criterion may be that data collected during the already performed FTM scans is enough to generate the basic topology map of neighbor devices (e.g., the second APs). It may be noted that the examples of the predetermined completion criterion described hereinabove are for illustration purposes. The first AP is also envisioned to use any other suitable predetermined completion criterion to perform the check at step 326, without limiting the scope of the present disclosure.

At step 326, if it is determined that the FTM scanning is not completed, the first AP, at step 328, may update the scanning parameter values such as the count of FTM scans performed, the count of failed FTM scans, and/or the wireless signal strength for each of the second APs after the first FTM scan cycle is completed. Further, at step 330, the first AP may update the weights of the plurality of second APs. Updating the weights of the plurality of second APs at step 330 may include recalculating the weights based on these updated scanning parameter values in a similar manner as described in conjunction with steps 310-320. After the weights of the plurality of second APs have been updated, the first AP may store the updated values of the scanning parameters and the weights of the plurality of second APs in the FTM scanning datastore and move the execution to step 322 to perform another FTM scan cycle. Turning again to step 326, if it is determined that the FTM scanning is completed, the first AP may end the method 300.

Figure 4:
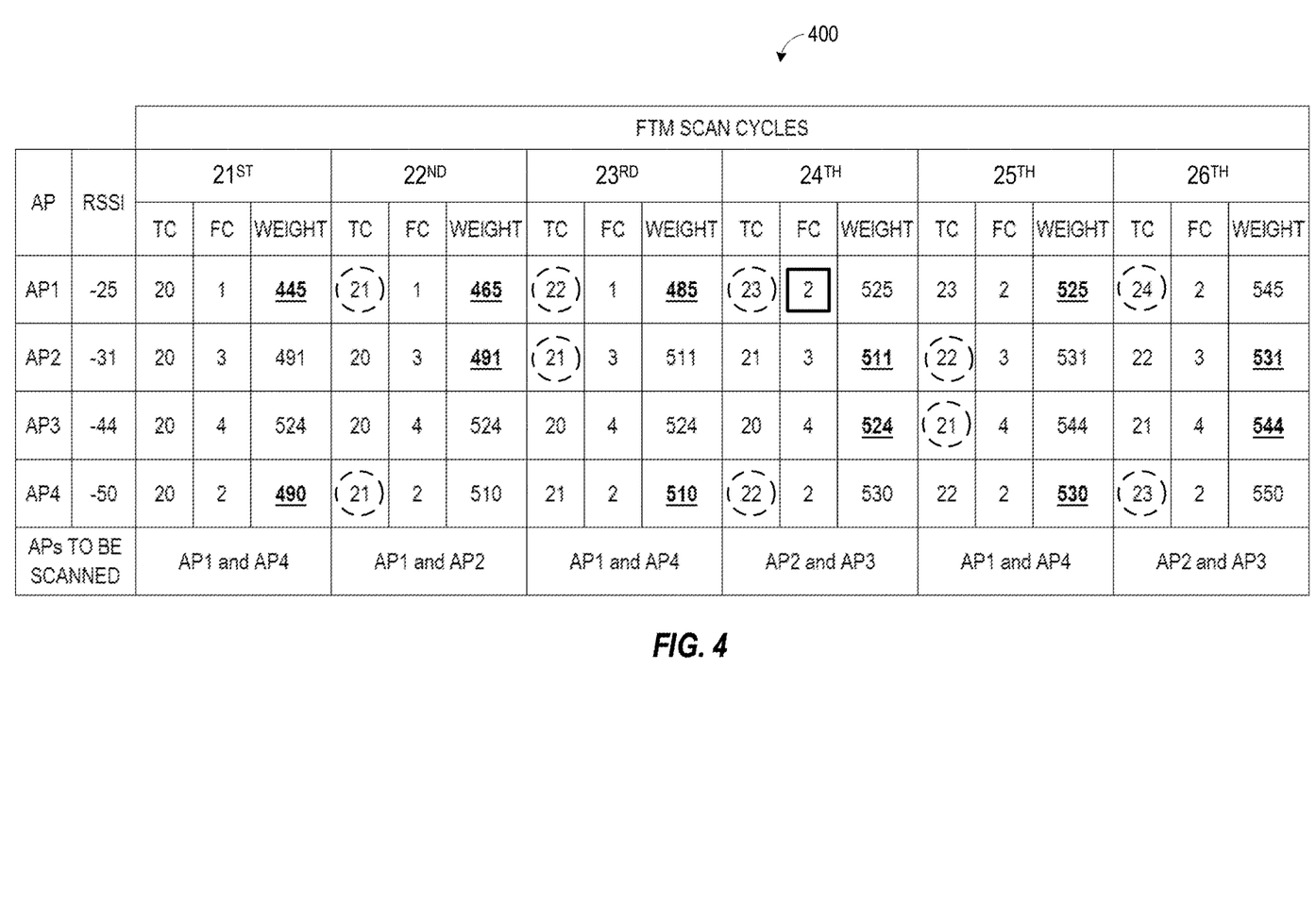
FIG. 4 depicts an example data table depicting scanning parameter values and weights of APs for multiple FTM scan cycles.

Referring now to FIG. 4, an example data table 400 depicting scanning parameter values and weights of APs for multiple FTM scan cycles is presented. The data table 400 may be representative of at least a portion of the data stored in the FTM scanning datastore, for example, the FTM scanning datastore 118 depicted in FIG. 1. In the example data table 400 of FIG. 4, the selection of target APs from a set of four FTM capable APs (e.g., a plurality of second APs) AP1, AP2, AP3, and AP4 (listed first column of the data table 400) is illustrated. Further, for the purpose of illustration, an initiator of the FTM (e.g., a first AP such as the AP 102 of FIG. 1), hereinafter referred to as the initiator, is configured to perform a training phase with 20 FTM scans. Based on the training phase with 20 FTM scans, the RSSI values of AP1, AP2, AP3, and AP4 were determined as −25, −31, −44, and −50, respectively. Also, at the end of the training phase, the counts of failed FTM scans (FC) for AP1, AP2, AP3, and AP4 were determined as 1, 3, 4, and 2, respectively.

The FTM scans beginning from the $21^{st}$ FTM scan cycle are executed as a runtime phase where the initiator uses the scanning parameter values based on the previously performed FTM scans. For the determination of the weights in each of the following scans (e.g., beginning from the $21^{st}$ FTM scan), for the purpose of illustration, the same RSSI values were used because the RSSI values remain generally the same for stationary APs.

To perform the $21^{st}$ FTM scan cycle, the initiator may determine the weights of AP1, AP2, AP3, and AP4. For example, for AP1, with the count of FTM scans performed being 20, the count of failed FTM scans being 1, and the RSSI being −25, the initiator may determine the weight of AP1 as 445 using the example relationships of the equations 1, 2, and 3. Likewise, for the $21^{st}$ FTM scan cycle, the weights of AP2, AP3, and AP4 may be determined as 491, 524, and 490, respectively. After the weights of the AP1, AP2, AP3, and AP4 are determined, the initiator may select a set of target APs to be scanned in the $21^{st}$ FTM scan cycle. For purpose of illustration in FIG. 4, the initiator is configured to select two APs as the set of target APs. For example, two APs with lower weights among the AP1, AP2, AP3, and AP4 may be selected as target APs. Accordingly, for the $21^{st}$ scan cycle, AP1 (having weight 445) and AP4 (having weight 490) may be selected and an FTM scan (i.e., $21^{st}$ FTM scan) is performed for AP1 and AP4. In the $21^{st}$ FTM scan cycle, no FTM scan is performed for AP2 and AP3. In some other examples, the initiator may apply any of the predetermined selection criteria described in conjunction with FIG. 2.

Once the $21^{st}$ FTM scan cycle is completed, the scanning parameter values are updated. For example, for the $22^{nd}$ FTM scan cycle, the count of FTM cycles performed for AP1, AP2, AP3, and AP4 may respectively be 21, 20, 20, and 21. Updates in the count of FTM cycles performed are marked using a dashed circle in the data table 400. Since the $21^{st}$ FTM has not failed for any of the APs the count of failed FTM scans remains unchanged. Also, the RSSI values may be used unchanged as described above. Accordingly, for the $22^{nd}$ FTM scan cycle, the weights of AP1, AP2, AP3, and AP4 may be respectively determined as 465, 491, 524, and 510. The bottom-weighted two APs, for example, AP1 and AP2 may be selected for performing the FTM scan in the $22^{nd}$ FTM cycle, and no FTM scan is performed for AP3 and AP4. Likewise, a $23^{rd}$ FTM scan cycle may also be executed based on the respective scanning parameter values as depicted in the data table 400. In the example presented, the $23^{rd}$ FTM scan has failed for AP1. Accordingly, the count of failed FTM scans has been updated to 2 from 1 (marked with a square), which may be used the determine the weight of AP1 for the $24^{th}$ FTM scan cycle.

In each scan cycle, the bottom-weighed two APs (respective weights are marked with an underline) may be selected for FTM scanning. For example, AP1 and AP4 may be scanned in the $21^{st}$ FTM scan cycle, AP1 and AP2 may be scanned in the $22^{nd}$ FTM scan cycle, AP1 and AP4 may be scanned in the $23^{rd}$ FTM scan cycle, AP2 and AP3 may be scanned in the $24^{th}$ FTM scan cycle, AP1 and AP4 may be scanned in the $25^{th}$ FTM scan cycle, and AP2 and AP3 may be scanned in the $26^{th}$ FTM scan cycle.

Figure 5:
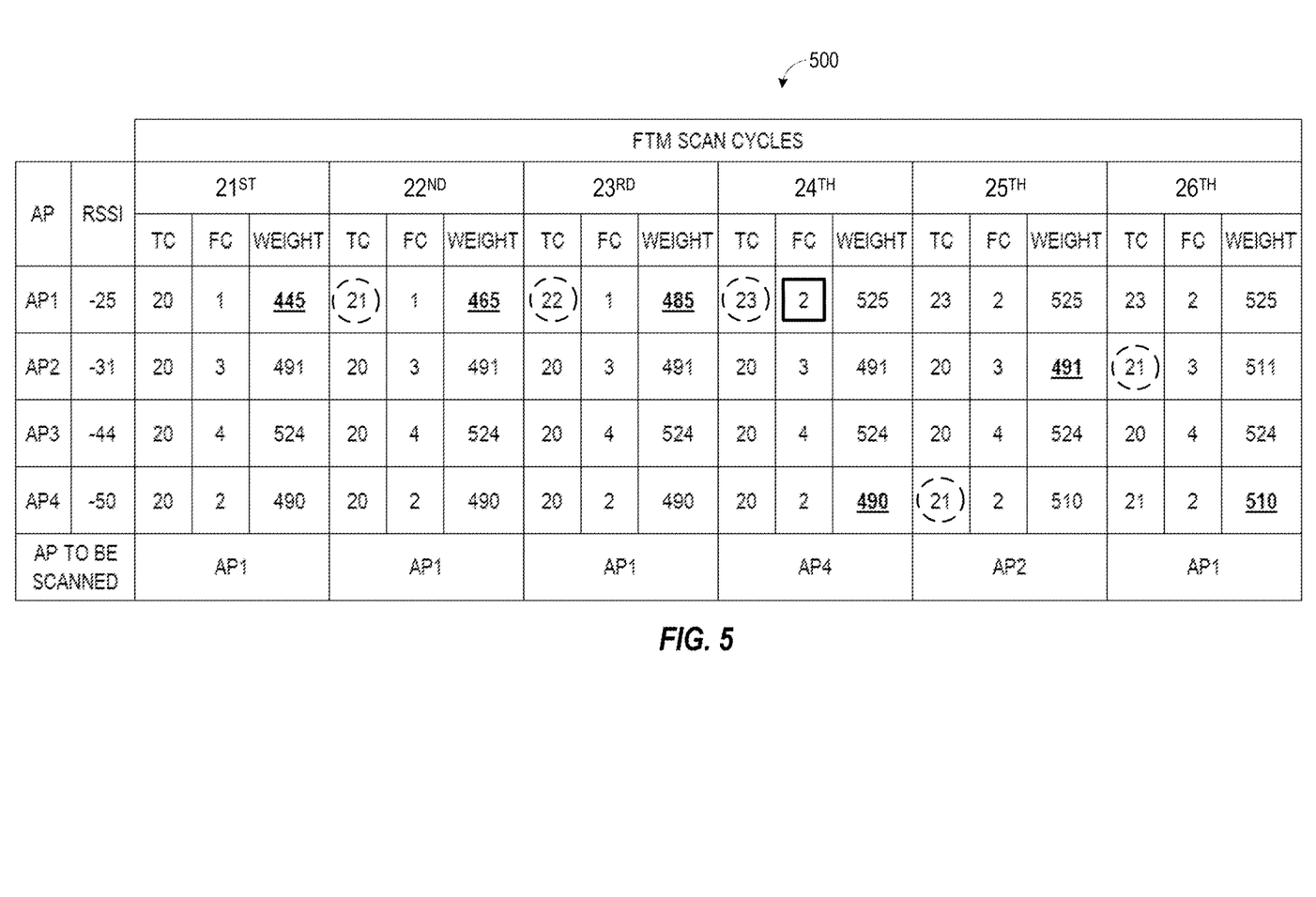
FIG. 5 depicts another example data table depicting scanning parameter values and weights of APs for multiple FTM scan cycles.

Referring now to FIG. 5, another example data table 500 depicting scanning parameter values and weights of APs for multiple FTM scan cycles is presented. With the help of the example data table 500 of FIG. 5, the selection of a set of target APs having only one target AP is illustrated. Further, for the purpose of illustration, similar to FIG. 4, an initiator of the FTM is configured to perform a training phase with 20 FTM scans, and similar scanning parameter values have been observed after the completion of the training phase.

To perform the $21^{st}$ FTM scan cycle, the initiator may respectively determine the weights of AP1, AP2, AP3, and AP4 as 445, 491, 524, and 490, using the example relationships of the equations 1, 2, and 3. After the weights of the AP1, AP2, AP3, and AP4 are determined, the initiator may select a single target AP to be scanned in the $21^{st}$ FTM scan cycle. For the purpose of illustration in FIG. 5, the initiator is configured to select a single AP having the lowest weight among the AP1, AP2, AP3, and AP4. Accordingly, for the $21^{st}$ FTM scan cycle, AP1 having the lowest weight of 445 may be selected an FTM scan (i.e., $21^{st}$ FTM scan) is performed for AP1 only. In the $21^{st}$ FTM scan cycle, no FTM scan is performed for AP2, AP3, and AP4.

Once the $21^{st}$ FTM scan cycle is completed, the scanning parameter values are updated. For example, for the $22^{nd}$ FTM scan cycle, the count of FTM cycles performed for AP1, AP2, AP3, and AP4 may respectively be 21, 20, 20, and 20. Likewise, for each FTM scan cycle, any updates in the count of FTM scans performed are marked with dashed circles corresponding to each AP. Since the $21^{st}$ FTM has not failed for any of the APs the count of failed FTM scans remains unchanged. Also, the RSSI values may be used unchanged as described above. Using the data presented in the data table 500, for the $22^{nd}$ FTM scan cycle, the weights of AP1, AP2, AP3, and AP4 may be respectively determined as 465, 491, 524, and 490. Again, AP1 having the lowest weight may be selected for performing the FTM scan in the $22^{nd}$ FTM cycle, and AP2, AP3, and AP4 may not be scanned. Likewise, $23^{rd}$ FTM scan cycle may also be executed based on the respective scanning parameter values as depicted in the data table 500. In the example presented, the $23^{rd}$ FTM scan has failed for AP1. Accordingly, the count of failed FTM scans has been updated to 2 from 1 (marked with a square), which may be used the determine the weight of AP1 for the $24^{th}$ FTM scan cycle.

In each scan cycle, only the AP having the lowest weight (respective weights are marked with an underline) may be selected for FTM scanning. For example, AP1 may be scanned in the $21^{st}$, $22^{nd}$, and $23^{rd}$ FTM scan cycles, AP4 may be scanned in the $24^{th}$ and $26^{th}$ FTM scan cycles, and AP2 may be scanned in the $25^{th}$ FTM scan cycle.

Figure 6:
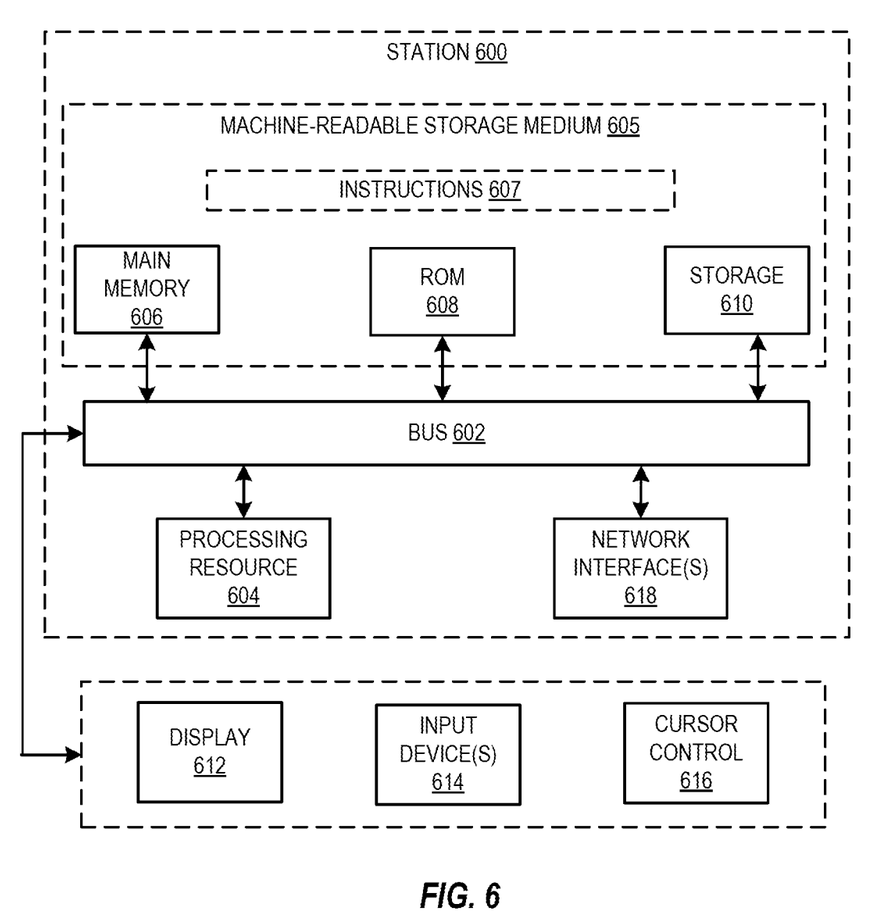
FIG. 6 depicts a block diagram of an example wireless station in which various of the examples described herein may be implemented.

FIG. 6 depicts a block diagram of an example wireless station 600 in which various of the examples described herein may be implemented. In some examples, the wireless station 600 may be configured to operate as an AP and can perform various operations described in one or more of the earlier drawings. In some other examples, the wireless station 600 may be a non-AP wireless device, such as, a wireless client device that supports wireless communication according to one or more IEEE 802.11 Specifications, for example, IEEE 802.11 mc. Examples of the wireless client device may be implemented as the wireless station 600 may include, desktop computers, laptop computers, servers, web servers, authentication servers, AAA servers, DNS servers, DHCP servers, IP servers, VPN servers, network policy servers, mainframes, tablet computers, e-readers, netbook computers, televisions and similar monitors (e.g., smart TVs), content receivers, set-top boxes, PDAs, mobile phones, smartphones, smart terminals, dumb terminals, virtual terminals, video game consoles, virtual assistants, IoT devices, and the like.

The wireless station 600 may include a bus 602 or other communication mechanisms for communicating information, a hardware processor, also referred to as processing resource 604, and a machine-readable storage medium 605 coupled to the bus 602 for processing information. In some examples, the processing resource 604 may include one or more CPUs, semiconductor-based microprocessors, and/or other hardware devices suitable for retrieval and execution of instructions stored in a machine-readable storage medium 605. The processing resource 604 may fetch, decode, and execute instructions, and perform FTM scanning for one or more of the neighbor APs. As an alternative or in addition to retrieving and executing instructions, the processing resource 604 may include one or more electronic circuits that include electronic components for performing the functionality of one or more instructions, such as an FPGA, an ASIC, or other electronic circuits.

In some examples, the machine-readable storage medium 605 may include a main memory 606, such as a RAM, cache and/or other dynamic storage devices, coupled to the bus 602 for storing information and instructions to be executed by the processing resource 604. The main memory 606 may also be used for storing temporary variables or other intermediate information during the execution of instructions to be executed by the processing resource 604. Such instructions, when stored in storage media accessible to the processing resource 604, render the wireless station 600 into a special-purpose machine that is customized to perform the operations specified in the instructions. The machine-readable storage medium 605 may further include a read-only memory (ROM) 608 or other static storage device coupled to the bus 602 for storing static information and instructions for the processing resource 604. Further, in the machine-readable storage medium 605, a storage device 610, such as a magnetic disk, optical disk, or USB thumb drive (Flash drive), etc., may be provided and coupled to the bus 602 for storing information and instructions.

In some examples, the wireless station 600 may be coupled, via the bus 602, to a display 612, such as a liquid crystal display (LCD) (or touch-sensitive screen), for displaying information to a computer user. In some examples, an input device 614, including alphanumeric and other keys (physical or software generated and displayed on touch-sensitive screen), may be coupled to the bus 602 for communicating information and command selections to the processing resource 604. Also, in some examples, another type of user input device such as a cursor control 616 may be connected to the bus 602. The cursor control 616 may include a mouse, a trackball, cursor direction keys, or combinations thereof, for example. The cursor control 616 may communicate direction information and command selections to the processing resource 604 for controlling cursor movement on the display 612. In some other examples, the same direction information and command selections as cursor control may be implemented via receiving touches on a touch screen without a cursor.

In some examples, the wireless station 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The wireless station 600 also includes a network interface 618 coupled to bus 602. The network interface 618 provides a two-way data communication coupling to one or more network links that are connected to one or more local networks. For example, the network interface 618 may be an integrated services digital network (ISDN) card, cable modem, satellite modem, or a modem to provide a data communication connection to a corresponding type of telephone line. As another example, the network interface 618 may be a local area network (LAN) card or a wireless communication unit (e.g., Wi-Fi chip/module).

In some examples, the machine-readable storage medium 605 (e.g., one or more of the main memory 606, the ROM 608, or the storage device 610) stores instructions 607 which when executed by the processing resource 604 may cause the processing resource 604 to execute one or more of the methods/operations described hereinabove. The instructions 607 may be stored on any of the main memory 606, the ROM 608, or the storage device 610. In some examples, the instructions 607 may be distributed across one or more of the main memory 606, the ROM 608, or the storage device 610. In some examples, when the wireless station 600 is configured to operate as an AP, the instructions 607 may include instructions that when executed by the processing resource 604 may cause the processing resource 604 to perform one or more of the methods described in FIGS. 2 and 3A-3B.

In some examples, one or more of the instructions 607 when executed by the processing resource 604 may cause the processing resource 604 to determine scanning parameter values corresponding to a plurality of second APs based on previously performed FTM scans for the plurality of second APs. Further, one or more of the instructions 607 when executed by the processing resource 604 may cause the processing resource 604 to determine weights corresponding to the plurality of second APs based on the scanning parameter values. Further, one or more of the instructions 607 when executed by the processing resource 604 may cause the processing resource 604 to select a first set of target APs from the plurality of second APs based on the weights. Furthermore, one or more of the instructions 607 when executed by the processing resource 604 may cause the processing resource 604 to scan the first set of target APs for a first FTM scan cycle. Also, one or more of the instructions 607 when executed by the processing resource 604 may cause the processing resource 604 to update the weights of the plurality of second APs after completion of the first FTM scan cycle to generate updated weights. Moreover, one or more of the instructions 607 when executed by the processing resource 604 may cause the processing resource 604 to select a second set of target APs from the plurality of second APs based on the updated weights, wherein the second set of target APs comprises one or more target APs different from the first set of target APs. Additionally, one or more of the instructions 607 when executed by the processing resource 604 may cause the processing resource 604 to scan the second set of target APs for a second FTM scan cycle.

Terms and phrases used in this document, and variations thereof, unless otherwise expressly stated, should be construed as open-ended as opposed to limiting. As examples of the foregoing, the term "including" should be read as meaning "including, without limitation" or the like. The term "example" is used to provide exemplary instances of the item in the discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent. Further, the term "and/or" as used herein refers to and encompasses any and all possible combinations of the associated listed items. It will also be understood that, although the terms first, second, third, etc., may be used herein to describe various elements, these elements should not be limited by these terms, as these terms are only used to distinguish one element from another unless stated otherwise or the context indicates otherwise.

What is claimed is:

1. A method comprising:
   determining, by a first access point (AP), scanning parameter values corresponding to a plurality of second access points (APs) based on previously performed Fine Timing Measurement (FTM) scans for the plurality of second APs, wherein the scanning parameter values comprise at least a count of failed FTM scans;
   determining, by the first AP, weights corresponding to the plurality of second APs based at least on the count of failed FTM values;
   selecting, by the first AP, a first set of target APs from the plurality of second APs based on the weights;
   scanning, by the first AP, the first set of target APs for a first FTM scan cycle;

updating, by the first AP, the weights of the plurality of second APs after completion of the first FTM scan cycle to generate updated weights;

selecting, by the first AP, a second set of target APs from the plurality of second APs based on the updated weights, wherein the second set of target APs comprises one or more target APs different from the first set of target APs; and scanning, by the first AP, the second set of target APs for a second FTM scan cycle.

2. The method of claim 1, further comprising identifying, by the first AP, the plurality of second APs from neighbor APs of the first AP based on an FTM support of the neighbor APs.

3. The method of claim 1, wherein the scanning parameter values further comprise a count of FTM scans performed and a wireless signal strength.

4. The method of claim 3, further comprising recording the count of FTM scans performed, the count of failed FTM scans, and the wireless signal strength based on a predetermined number of the previously performed FTM scans, wherein the weights corresponding to the plurality of second APs are determined based on respective values of the count of FTM scans performed, the count of failed FTM scans, and the wireless signal strength.

5. The method of claim 3, wherein determining the weights comprises:
for each second AP of the plurality of second APs:
generating a first sum of the count of FTM scans and the count of failed FTM scans; and
generating a second sum of the wireless signal strength and the first sum.

6. The method of claim 5, wherein generating the first sum comprises:
generating a third sum of the count of FTM scans and the count of failed FTM scans; and
multiplying the third sum with a multiplication factor.

7. The method of claim 6, wherein the multiplication factor is a predefined value.

8. The method of claim 6, wherein the multiplication factor is determined based on a range of wireless signal strength, wherein the wireless signal strength is measured as a received signal strength indicator (RSSI) at the first AP.

9. The method of claim 1, wherein selecting the first set of target APs comprises selecting two or more of the plurality of the second APs based on the weights.

10. The method of claim 1, wherein selecting the first set of target APs comprises selecting a single AP of the second APs having the lowest weight.

11. The method of claim 1, wherein scanning the first set of target APs during the first FTM scan cycle and the second set of target APs during the second FTM scan cycle relieves the rest of the plurality of second APs from participating in the first FTM scan cycle and the second FTM scan cycle, respectively, thereby reducing performance impact on the rest of the plurality of second APs.

12. The method of claim 1, wherein the first AP and the plurality of second APs support the Institute of Electrical and Electronics Engineers (IEEE) 802.11 mc Specification.

13. A wireless station, comprising:
a machine-readable storage medium storing instructions; and
a processing resource coupled to the machine-readable storage medium, wherein the processing resource is configured to execute one or more of the instructions to:
determine scanning parameter values corresponding to a plurality of APs based on previously performed FTM scans for the plurality of APs, wherein the scanning parameter values comprise at least a count of failed FTM scans;
determine weights corresponding to the plurality of APs based at least on the count of failed FTM values;
select a first set of target APs from the plurality of APs based on the weights;
scan the first set of target APs for a first FTM scan cycle;
update the weights of the plurality of APs after completion of the first FTM scan cycle to generate updated weights;
select a second set of target APs from the plurality of APs based on the updated weights, wherein the second set of target APs comprises one or more target APs different from the first set of target APs; and
scan the second set of target APs for a second FTM scan cycle.

14. The wireless station of claim 13, wherein the scanning parameter values further comprise a count of FTM scans performed and a wireless signal strength, and wherein, to determine the weights, the processing resource is configured to execute one or more of the instructions to:
for each AP of the plurality of APs:
generate a first sum of the count of FTM scans and the count of failed FTM scans; and
generate a second sum of the wireless signal strength and the first sum.

15. The wireless station of claim 14, wherein, to generate the first sum, the processing resource is configured to execute one or more of the instructions to:
generate a third sum of the count of FTM scans and the count of failed FTM scans; and
multiply the third sum with a multiplication factor.

16. A system comprising:
a first AP; and
a plurality of neighbor APs of the first AP,
wherein the first AP is configured to:
identify a plurality of second APs from the neighbor APs based on FTM capabilities of the neighbor APs;
determine scanning parameter values corresponding to a plurality of second APs based on previously performed FTM scans for the plurality of second APs, wherein the scanning parameter values comprise at least a count of failed FTM scans;
determine weights corresponding to the plurality of second APs based at least on the count of failed FTM values;
select a first set of target APs from the plurality of second APs based on the weights;
scan the first set of target APs for a first FTM scan cycle;
update the weights of the plurality of second APs after completion of the first FTM scan cycle to generate updated weights;
select a second set of target APs from the plurality of second APs based on the updated weights, wherein the second set of target APs comprises one or more target APs different from the first set of target APs; and
scan the second set of target APs for a second FTM scan cycle.

17. The system of claim 16, wherein the scanning parameter values further comprise a count of FTM scans performed and a wireless signal strength, and wherein, to determine the weights, the first AP is configured to:

for each second AP of the plurality of second APs:

generate a first sum of the count of FTM scans and the count of failed FTM scans; and         generate a second sum of the wireless signal strength and the first sum.

18. The system of claim 17, wherein, to generate the first sum, the first AP is configured to:

generate a third sum of the count of FTM scans and the count of failed FTM scans; and     multiply the third sum with a multiplication factor.

19. The system of claim 18, wherein use of the count of FTM scans performed, the count of failed FTM scans, and the multiplication factor in determining the weights of the plurality of APs provides an opportunity for a majority of the plurality of APs or each of the plurality of APs to be selected for FTM scanning.

20. The system of claim 16, wherein the first set of target APs comprises two or more of the plurality of the second APs having smaller weights than a threshold value.

* * * * *